US009215353B2

United States Patent
Ueno et al.

(10) Patent No.: US 9,215,353 B2
(45) Date of Patent: Dec. 15, 2015

(54) IMAGE PROCESSING DEVICE, IMAGE PROCESSING METHOD, IMAGE DISPLAY DEVICE, AND IMAGE DISPLAY METHOD

(75) Inventors: Masafumi Ueno, Osaka (JP); Xiaomang Zhang, Osaka (JP); Yasuhiro Ohki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 397 days.

(21) Appl. No.: 13/700,339

(22) PCT Filed: Apr. 4, 2011

(86) PCT No.: PCT/JP2011/058550
§ 371 (c)(1),
(2), (4) Date: Nov. 27, 2012

(87) PCT Pub. No.: WO2011/155258
PCT Pub. Date: Dec. 15, 2011

(65) Prior Publication Data
US 2013/0069922 A1 Mar. 21, 2013

(30) Foreign Application Priority Data
Jun. 8, 2010 (JP) ................................. 2010-131425

(51) Int. Cl.
*G09G 5/00* (2006.01)
*H04N 5/21* (2006.01)
*H04N 7/01* (2006.01)
*H04N 5/14* (2006.01)
*H04N 21/488* (2011.01)

(52) U.S. Cl.
CPC ................. *H04N 5/21* (2013.01); *H04N 7/014* (2013.01); *H04N 7/0132* (2013.01); *H04N 7/0147* (2013.01); *G09G 2320/0261* (2013.01); *G09G2320/106* (2013.01); *G09G 2340/0435* (2013.01); *H04N 5/145* (2013.01); *H04N 21/4884* (2013.01)

(58) Field of Classification Search
CPC ............... G09G 2320/0261; G09G 2340/0435
See application file for complete search history.

(56) References Cited

U.S. PATENT DOCUMENTS 5,995,154 A * 11/1999 Heimburger .................. 348/448
7,468,716 B2 * 12/2008 Lee et al. ......................... 345/89

(Continued)

FOREIGN PATENT DOCUMENTS

EP 0735747 A1 10/1996
JP 09261600 A 10/1997

(Continued)

OTHER PUBLICATIONS

International Search Report PCT/ISA/210.
Written Opinion PCT/ISA/237.

*Primary Examiner* — Carolyn R Edwards
(74) *Attorney, Agent, or Firm* — Harness, Dickey & Pierce, PLC

(57) ABSTRACT

A three-dimensional noise reduction processing unit perform as a recursive noise reduction process to an input image X(n), using a motion vector MV detected by a motion vector detecting unit. A three-dimensional noise reduced image B(n) is output as a corrected original image Y(n). A two-dimensional noise reduction filter processing unit applies a two-dimensional noise reduction filter to the input image X(n). Using the motion vector MV, an interpolated image generating unit generates an interpolated image Y(n+0.5) based on a two-dimensional noise reduced image A(n). Significant degradation of an interpolated image due to false detection of a motion vector is prevented by generating the interpolated image based on the image resulted without performing the recursive noise reduction process.

13 Claims, 12 Drawing Sheets

(56) References Cited

U.S. PATENT DOCUMENTS

| | | | |
|---|---|---|---|
| 2005/0135698 A1* | 6/2005 | Yatsenko et al. | 382/260 |
| 2009/0322858 A1* | 12/2009 | Mitsuya et al. | 348/43 |
| 2010/0302438 A1* | 12/2010 | Fujisawa et al. | 348/441 |
| 2013/0300827 A1* | 11/2013 | Ueno et al. | 348/43 |

FOREIGN PATENT DOCUMENTS

| | | |
|---|---|---|
| JP | 2004088234 A | 3/2004 |
| JP | 2006023812 A | 1/2006 |
| JP | 3882854 B2 | 2/2007 |
| JP | 2010093680 A | 4/2010 |

* cited by examiner

IMAGE PROCESSING DEVICE, IMAGE PROCESSING METHOD, IMAGE DISPLAY DEVICE, AND IMAGE DISPLAY METHOD

TECHNICAL FIELD

The present invention relates to image processing devices, image processing methods, image display devices, and image display methods, and in particular, to an image processing device, an image processing method, an image display device, and an image display method, for performing a frame rate conversion process and a recursive noise reduction process.

BACKGROUND ART

Hold-type display devices such as liquid crystal display devices have a problem that when displaying images in motion, outlines of moving objects are shown blurred (hereinafter, this phenomenon is referred to as a motion blur). As a method for preventing such a motion blur from occurring, a method of increasing a frame rate by interpolating a new frame between two consecutive frames (frame rate conversion process) is known. Further, there is also known a method of performing motion compensation using a motion vector when performing the frame rate conversion process, in order to effectively prevent the motion blur.

Aside from this, as a method for reducing noises included in a motion picture, a recursive noise reduction process using a motion vector is known. FIG. 13 is a block diagram illustrating a configuration of a noise reduction device described in Patent Document 1. In a noise reduction device 110 illustrated in FIG. 13, a frame memory 116 included in a motion-detecting frame-cyclic noise reduction means 111 stores an output video signal of a previous frame. A vector detection means 117 obtains a motion vector MV and a motion component MC (an amount indicating a change in corresponding pixels) based on an input video signal and the output video signal of the previous frame output from the frame memory 116. A cyclic feedback amount control circuit 112 obtains a cyclic coefficient k based on the motion component MC. A multiplier 113 multiplies a pixel value included in the input video signal by (1−k), a multiplier 114 multiplies a corresponding pixel value (a pixel value read from the frame memory 116 using the motion vector MV) by k, and an adder 115 adds outputs from the multipliers 113 and, 114. An output from the adder 115 is output outside the noise reduction device 110 as an output video signal, and stored in the frame memory 116 in preparation for a process to an input video signal of a next frame. According to the noise reduction device 110, it is possible to reduce noises uncorrelated along a time axis (flickering noises), and to prevent an occurrence of a residual image in a motion area, and whereby a clear and high-quality image can be obtained.

Further, a method of combining the frame rate conversion process using motion compensation and the recursive noise reduction process using a motion vector is considered. FIG. 14 is a block diagram illustrating a configuration of an image processing device for performing a frame rate conversion process and a recursive noise reduction process. In an image processing device 120 illustrated in FIG. 14, a frame memory 121, a motion vector detecting unit 122, an interpolated image generating unit 124, and a time base converting unit 125 perform a frame rate conversion process based on motion compensation. A three-dimensional noise reduction processing unit 123 performs a recursive noise reduction process using a motion vector detected by the motion vector detecting unit 122. According to the image processing device 120, it is possible to prevent motion blurs that occur in a hold-type display device, as well as to display a high quality motion picture by performing noise reduction without giving a sense of presence of residual images when displaying a motion picture. In addition, by using the motion vector detecting unit 122 commonly both in the frame rate conversion process and the recursive noise reduction process, it is possible to reduce a circuit size and a memory capacity.

PRIOR ART DOCUMENT

Patent Document

[Patent Document 1] Japanese Laid-Open Patent Publication No. 2004-88234

SUMMARY OF THE INVENTION

Problems to be Solved by the Invention

However, in a motion vector detection process, it is not necessarily possible to always detect a correct motion vector. For example, in a case of a video image that is quick in motion, a video image showing an object that moves while changing its shape, or a video image in which one object in front of or behind a different object appears in and out of the vision, it is difficult to follow the movement, and therefore false detection of a motion vector can easily occur. Further, in a case in which a scene or brightness significantly changes between frames, such as in a case of a video image including a scene change or a flash of a camera, the false detection of a motion vector often occurs in an entire screen.

Second and subsequent embodiments in Patent Document 1 describe methods of reducing false detection of a motion vector. However, it is not possible to completely prevent false detection of a motion vector even using these methods. In addition, there is a problem that correction of an error in a motion vector reduces an effect of noise reduction.

In the frame rate conversion process, an occurrence of the false detection of a motion vector results in image degradation such that the shape of a moving object is distorted or that an image is doubly shown. In the case of the recursive noise reduction process, this results in image degradation such that an edge of an object is blurred or that tailing of a moving object is shown. When both of the frame rate conversion process and the recursive noise reduction process are performed, an image after the recursive noise reduction process includes a motion blur or tailing. In addition, as an interpolated image is generated based on the image after the recursive noise reduction process, a part at which the motion blur or the tailing motion has occurred is further distorted. As a result, the interpolated image is often degraded significantly.

Thus, an object of the present invention is to provide an image processing device, an image processing method, an image display device, and an image display method, for performing a frame rate conversion process and a recursive noise reduction process, and of preventing significant degradation of an interpolated image due to false detection of a motion vector.

Means for Solving the Problems

According to a first aspect of the present invention, there is provided an image processing device for performing a frame rate conversion process and a recursive noise reduction process, the device including: a motion vector detecting unit configured to detect a motion vector from input images that are input consecutively; a first noise reduction processing unit configured to perform the recursive noise reduction process to the input image using the motion vector; a second noise reduction processing unit configured to apply a noise reduction filter to the input image; and an interpolated image generating unit configured to generate an interpolated image using the motion vector and based on a reference image, wherein a corrected original image obtained by a predetermined method and the interpolated image generated based on the reference image are output, the reference image being obtained by a method different from that for the corrected original image.

According to a second aspect of the present invention, in the first aspect of the present invention, the corrected original image is an image obtained by the first noise reduction processing unit, and the reference image is an image obtained by the second noise reduction processing unit.

According to a third aspect of the present invention, in the first aspect of the present invention, the image processing device further includes: a selecting unit configured to select one of outputs from the first and the second noise reduction processing unit, and to obtain the reference image, wherein the corrected original image is an image obtained by the first noise reduction processing unit.

According to a fourth aspect of the present invention, in the third aspect of the present invention, the image processing device further includes: a scene information detecting unit configured to detect scene information based on the input image, wherein the selecting unit performs the selection based on the scene information.

According to a fifth aspect of the present invention, in the third aspect of the present invention, the image processing device further includes: a telop information detecting unit configured to detect telop information based on the input image, wherein the selecting unit performs the selection based on the telop information.

According to a sixth aspect of the present invention, in the third aspect of the present invention, the image processing device further includes: an external information analyzing unit configured to analyze external information that is input from outside, wherein the selecting unit performs the selection based on an analysis result by the external information analyzing unit.

According to a seventh aspect of the present invention, in the first aspect of the present invention, the image processing device further includes: a weighted addition calculating unit configured to perform two weighted additions separately to outputs from the first and the second noise reduction processing unit, wherein the corrected original image is an image obtained by one of the weighted additions by the weighted addition calculating unit, and the reference image is an image obtained by the other of the weighted additions by the weighted addition calculating unit.

According to an eighth aspect of the present invention, in the seventh aspect of the present invention, the image processing device further includes: a scene information detecting unit configured to detect scene information based on the input image, wherein a weighting coefficient of the weighted addition calculating unit changes based on the scene information.

According to a ninth aspect of the present invention, in the seventh aspect of the present invention, the image processing device further includes: a telop information detecting unit configured to detect telop information based on the input image, wherein a weighting coefficient of the weighted addition calculating unit changes based on the telop information.

According to a tenth aspect of the present invention, in the seventh aspect of the present invention, the image processing device further includes: an external information analyzing unit configured to analyze external information that is input from outside, wherein a weighting coefficient of the weighted addition calculating unit changes based on an analysis result by the external information analyzing unit.

According to an eleventh aspect of the present invention, there is provided an image processing method of performing a frame rate conversion process and a recursive noise reduction process, the method including the steps of: detecting a motion vector from input images that are input consecutively; performing the recursive noise reduction process to the input image using the detected motion vector; applying a noise reduction filter to the input image; and generating an interpolated image using the detected motion vector and based on a reference image, wherein a corrected original image obtained by a predetermined method and the interpolated image generated based on the reference image are output, the reference image being obtained by a method different from that for the corrected original image.

According to a twelfth aspect of the present invention, there is provided an image display device for displaying an image with performing a frame rate conversion process and a recursive noise reduction process, the device including: a display panel; an image processing unit configured to perform the frame rate conversion process and the recursive noise reduction process; and a drive circuit configured to drive the display panel based on an output from the image processing unit, wherein the image processing unit includes: a motion vector detecting unit configured to detect a motion vector from input images that are input consecutively; a first noise reduction processing unit configured to perform the recursive noise reduction process to the input image using the motion vector; a second noise reduction processing unit configured to apply a noise reduction filter to the input image; and an interpolated image generating unit configured to generate an interpolated image using the motion vector and based on a reference image, wherein the image processing unit outputs a corrected original image obtained by a predetermined method and an interpolated image generated based on the reference image, the reference image being obtained by a method different from that for the corrected original image.

According to a thirteenth aspect of the present invention, there is provided an image display method of displaying an image on a display panel with performing a frame rate conversion process and a recursive noise reduction process, the method including the steps of: detecting a motion vector from input images that are input consecutively; performing the recursive noise reduction process to the input image using the detected motion vector; applying a noise reduction filter to the input image; generating an interpolated image using the detected motion vector and based on a reference image; and driving the display panel based on image signals respectively indicating a corrected original image obtained by a predetermined method and the interpolated image generated based on the reference image, the reference image being obtained by a method different from that for the corrected original image.

Effects of the Invention

According to the first or the eleventh aspect of the present invention, by performing the frame rate conversion process based on the motion compensation and the recursive noise reduction process using a motion vector, it is possible to prevent motion blurs that occur in a hold-type display device, and to prevent a residual image in a motion area from occurring, and whereby a clear and high-quality output image can be obtained. Further, by using the motion vector detecting unit commonly both in the frame rate conversion process and the recursive noise reduction process, it is possible to reduce a circuit size and a memory capacity. In addition, by obtaining the reference image by the method different from that for the corrected original image, it is possible to generate the interpolated image based on a suitable reference image, and to prevent significant degradation of the interpolated image even when false detection of a motion vector occurs.

According to the second aspect of the present invention, the interpolated image is generated based on the image resulted without performing the recursive noise reduction process. Therefore, even when the false detection of a motion vector occurs, it is possible to prevent significant degradation of the interpolated image. Further, the interpolated image is generated based on the image resulted by applying the noise reduction filter. Therefore, it is possible to reduce noises that are contained in the interpolated image and that cannot be reduced through the recursive noise reduction process.

According to the third aspect of the present invention, it is possible to obtain the reference image by appropriately switching between the image resulted by performing the recursive noise reduction process and the image resulted without performing the recursive noise reduction process, and to generate the interpolated image based thereon. Therefore, it is possible to generate a suitable interpolated image according to the situation, and to prevent significant degradation of the interpolated image even when the false detection of a motion vector occurs. In addition, by generating the interpolated image based on the image resulted by applying the noise reduction filter, it is possible to reduce noises that are contained in the interpolated image and that cannot be reduced through the recursive noise reduction process.

According to the fourth aspect of the present invention, it is possible to obtain the reference image by switching between the image resulted by performing the recursive noise reduction process and the image resulted without performing the recursive noise reduction process according to the characteristic of the scene represented by the input image, and to generate the interpolated image based thereon. Therefore, it is possible to generate a suitable interpolated image according to the characteristic of the scene, and to prevent significant degradation of the interpolated image even when the false detection of a motion vector occurs.

According to the fifth aspect of the present invention, it is possible to obtain the reference image by switching between the image resulted by performing the recursive noise reduction process and the image resulted without performing the recursive noise reduction process according to the characteristic of the telop included in the input image, and to generate the interpolated image based thereon. Therefore, it is possible to generate a suitable interpolated image according to the characteristic of the telop, and to prevent significant degradation of the interpolated image even when the false detection of a motion vector occurs.

According to the sixth aspect of the present invention, it is possible to obtain the reference image by switching between the image resulted by performing the recursive noise reduction process and the image resulted without performing the recursive noise reduction process according to the external information that is input from outside, and to generate the interpolated image based thereon. Therefore, it is possible to generate a suitable interpolated image according to the external information, and to prevent significant degradation of the interpolated image even when the false detection of a motion vector occurs.

According to the seventh aspect of the present invention, it is possible to obtain the reference image by performing the weighted additions to the image resulted by performing the recursive noise reduction process and the image resulted without performing the recursive noise reduction process, and to generate the interpolated image based thereon. Therefore, it is possible to generate a suitable interpolated image according to the situation, and to prevent significant degradation of the interpolated image even when the false detection of a motion vector occurs. In addition, by obtaining the reference image by increasing the weighting coefficient to be given to the image resulted by applying the noise reduction filter, it is possible to reduce noises that are contained in the interpolated image and that cannot be reduced through the recursive noise reduction process.

According to the eighth aspect of the present invention, it is possible to obtain the reference image by performing the weighted additions to the image resulted by performing the recursive noise reduction process and the image resulted without performing the recursive noise reduction process while changing the weighting coefficients according to the characteristic of the scene represented by the input image, and to generate the interpolated image based thereon. Therefore, it is possible to generate a suitable interpolated image according to the characteristic of the scene, and to prevent significant degradation of the interpolated image even when the false detection of a motion vector occurs.

According to the ninth aspect of the present invention, it is possible to obtain the reference image by performing the weighted additions to the image resulted by performing the recursive noise reduction process and the image resulted without performing the recursive noise reduction process while changing the weighting coefficients according to the characteristic of the telop included in the input image, and to generate the interpolated image based thereon. Therefore, it is possible to generate a suitable interpolated image according to the characteristic of the telop, and to prevent significant degradation of the interpolated image even when the false detection of a motion vector occurs.

According to the tenth aspect of the present invention, it is possible to obtain the reference image by performing the weighted additions to the image resulted by performing the recursive noise reduction process and the image resulted without performing the recursive noise reduction process while changing the weighting coefficients according to the external information that is input from outside, and to generate the interpolated image based thereon. Therefore, it is possible to generate a suitable interpolated image according to the external information, and to prevent significant degradation of the interpolated image even when the false detection of a motion vector occurs.

According to the twelfth or the thirteenth aspect of the present invention, it is possible to reduce motion blurs that occur in a hold-type display device, and to prevent a residual image in a motion area from occurring, and whereby a clear and high-quality image can be displayed. In addition, even when the false detection of a motion vector occurs, it is possible to prevent significant degradation of the interpolated image.

MODE(S) FOR CARRYING OUT THE INVENTION

First Embodiment

Figure 1:
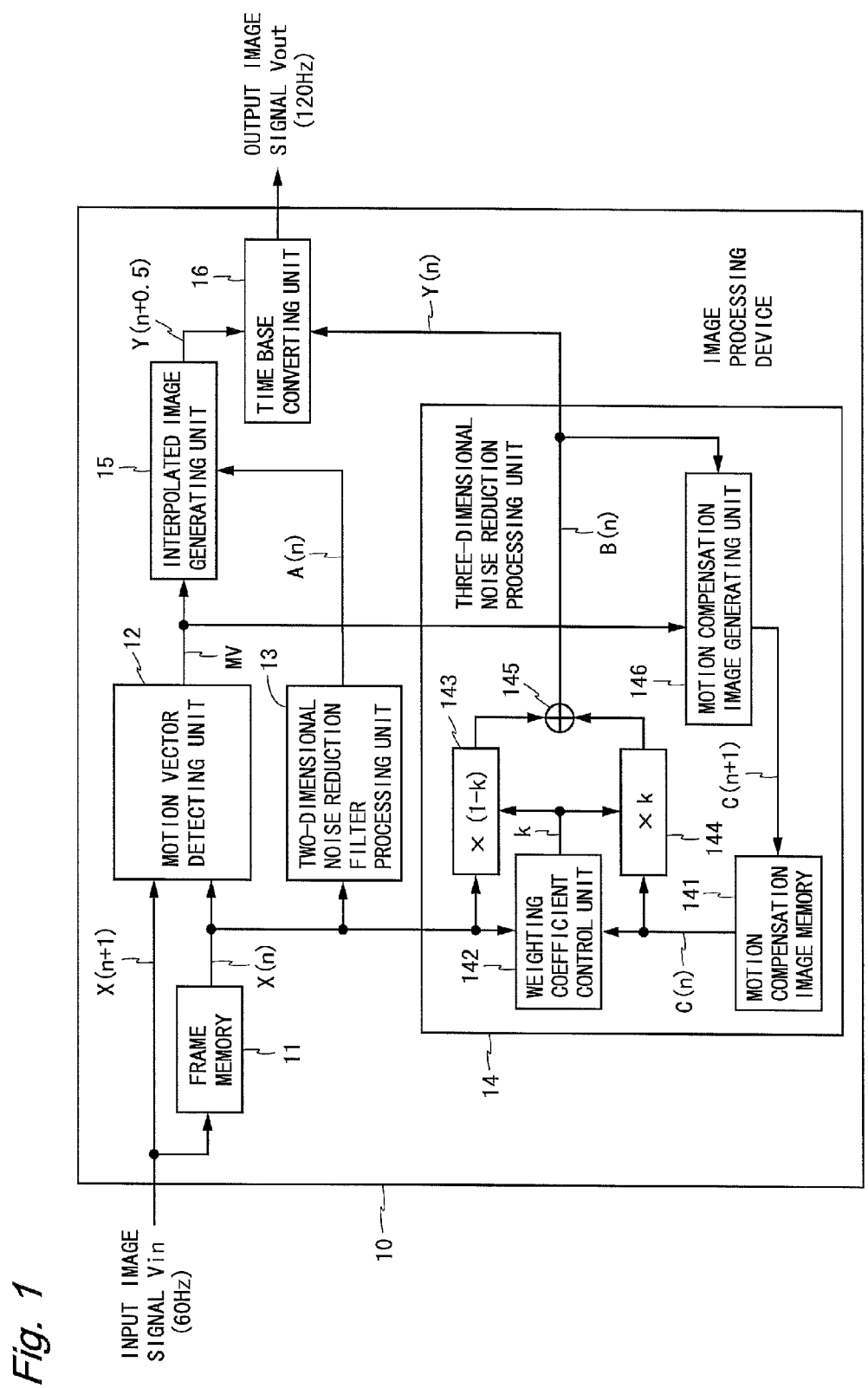
FIG. 1 is a block diagram illustrating a configuration of an image processing device according to a first embodiment of the present invention.

FIG. 1 is a block diagram illustrating a configuration of an image processing device according to a first embodiment of the present invention. An image processing device 10 illustrated in FIG. 1 includes a frame memory 11, a motion vector detecting unit 12, a two-dimensional noise reduction filter processing unit 13, a three-dimensional noise reduction processing unit 14, an interpolated image generating unit 15, and a time base converting unit 16. The image processing device 10 performs a frame rate conversion process based on motion compensation and a recursive noise reduction process using a motion vector.

Figure 2:
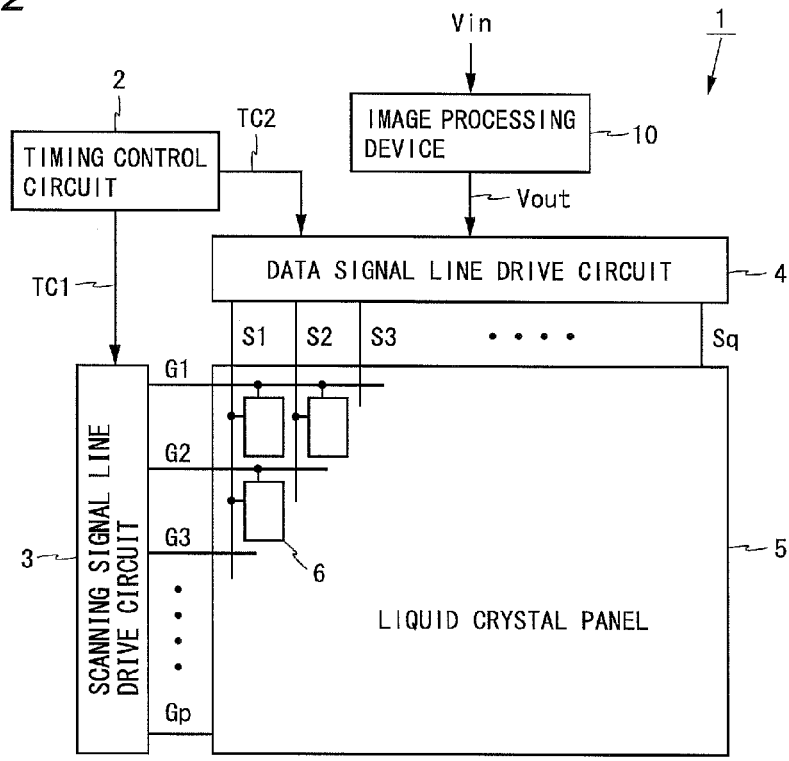
FIG. 2 is a block diagram illustrating a configuration of a liquid crystal display device including the image processing device according to the embodiment of the present invention.

FIG. 2 is a block diagram illustrating a configuration of a liquid crystal display device including the image processing device 10. A liquid crystal display device 1 illustrated in FIG. 2 includes the image processing device 10, a timing control circuit 2, a scanning signal line drive circuit 3, a data signal line drive circuit 4, and a liquid crystal panel 5. The liquid crystal panel 5 includes p scanning signal lines G1 to Gp, q data signal lines S1 to Sq, and (p×q) pixel circuits 6. The scanning signal lines G1 to Gp are arranged in parallel with each other, and the data signal lines S1 to Sq are arranged in parallel with each other so as to intersect perpendicularly with the scanning signal lines G1 to Gp. The (p×q) pixel circuits 6 are respectively disposed near intersections between the scanning signal lines G1 to Gp and the data signal lines S1 to Sq.

To the liquid crystal display device 1, an input image signal Vin having a frame rate of 60 Hz is input from outside. The image processing device 10 converts the input image signal Vin into an output image signal Vout having a frame rate of 120 Hz. The output image signal Vout is supplied to the data signal line drive circuit 4. The timing control circuit 2 supplies timing control signals TC1 and TC2 respectively to the scanning signal line drive circuit 3 and the data signal line drive circuit 4. The scanning signal line drive circuit 3 and the data signal line drive circuit 4 are drive circuits of the liquid crystal panel 5. The scanning signal line drive circuit 3 drives the scanning signal lines G1 to Gp based on the timing control signal TC1. The data signal line drive circuit 4 drives the data signal lines S1 to Sq based on the timing control signal TC2 and the output image signal Vout. By driving the liquid crystal panel 5 using the scanning signal line drive circuit 3 and the data signal line drive circuit 4, it is possible to display 120 images per second on the liquid crystal panel 5.

Figure 3:
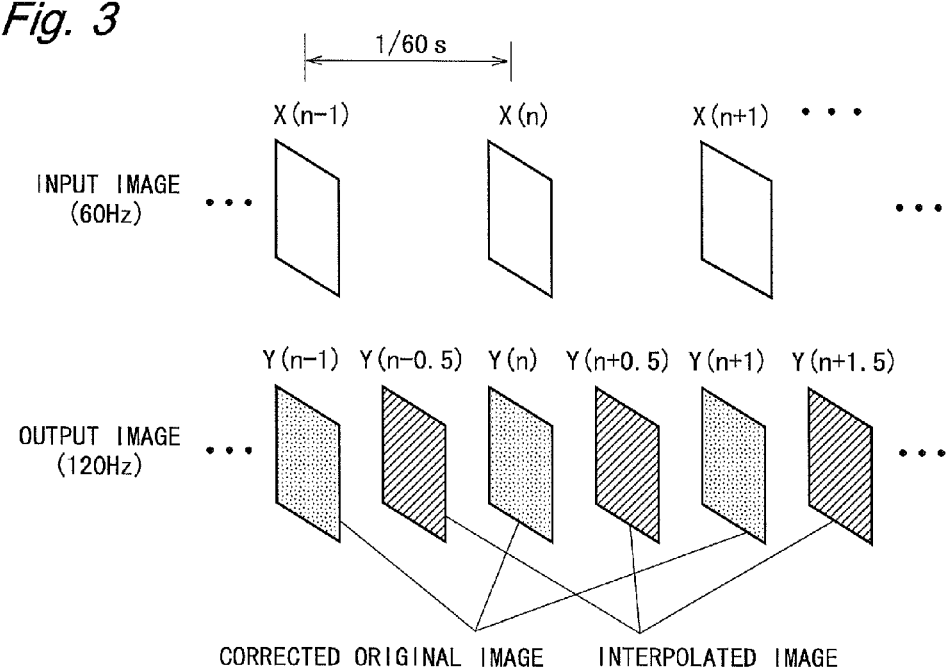
FIG. 3 is a diagram illustrating input images and output images in the image processing device illustrated in FIG. 1.

In the following, an image represented by the input image signal Vin is referred to as an input image, an image represented by the output image signal Vout is referred to as an output image, and an n-th input image is indicated by X(n). FIG. 3 is a diagram illustrating input images and output images in the image processing device 10, where 60 images are input per second as the input images, and 120 images are output per second as the output images. The output images include images resulted by performing the noise reduction process to the input images (images with dot patterns in FIG. 3, which is hereinafter referred to as corrected original images), and images newly generated by the image processing device 10 (images with hatching in FIG. 3, which is hereinafter referred to as interpolated images). A corrected original image corresponding to an input image X(n) is indicated by Y(n), and an interpolated image interpolated intermediately between the corrected original images Y(n) and Y(n+1) is indicated by Y(n+0.5). As will be described below, the image processing device 10 obtains a corrected original image by performing the recursive noise reduction process to an input image, and generates an interpolated image based on an image resulted by applying a two-dimensional noise reduction filter to the input image.

Referring back to FIG. 1, details of the image processing device 10 will be described below. Here, an operation of the image processing device 10 when an input image X(n+1) is input is described. The frame memory 11 stores input image signals Vin for a single frame, and outputs the signals by delaying a single frame period. When the input image X(n+1) is input, the frame memory 11 outputs the input image X(n) while storing the input image X(n+1).

The motion vector detecting unit 12 detects a motion vector from input images that are input consecutively. More specifically, the motion vector detecting unit 12 detects a motion vector MV between the two images based on the input image X(n+1) and the input image X(n) output from the frame memory 11. Any method can be used to detect the motion vector MV. The detected motion vector MV is supplied to the three-dimensional noise reduction processing unit 14 and the interpolated image generating unit 15.

The two-dimensional noise reduction filter processing unit 13 applies a two-dimensional noise reduction filter to the input image X(n) output from the frame memory 11. The two-dimensional noise reduction filter can take any characteristic. For example, a lowpass filter or a median filter can be used as the two-dimensional noise reduction filter.

An output from the two-dimensional noise reduction filter processing unit 13 is supplied to the interpolated image generating unit 15 as a two-dimensional noise reduced image A(n).

The three-dimensional noise reduction processing unit performs the recursive noise reduction process (three-dimensional noise reduction process) using the motion vector to the input image X(n). More specifically, the three-dimensional noise reduction processing unit 14 includes a motion compensation image memory 141, a weighting coefficient control unit 142, coefficient multipliers 143 and 144, an adder 145, and a motion compensation image generating unit 146. When the input image X(n) is output from the frame memory 11, the motion compensation image memory 141 outputs a motion compensation image C(n) resulted from the input image X(n−1) subjected to the recursive noise reduction process and the motion compensation.

The weighting coefficient control unit 142 compares the input image X(n) with the motion compensation image C(n), and thereby determines a weighting coefficient k (where, 0≤k≤1). The weighting coefficient control unit 142 obtains brightness differences between the input image X(n) and the motion compensation image C(n) and brightness slope information, for example, and changes the weighting coefficient k according to the obtained values. Alternatively, the weighting coefficient control unit 142 may change the weighting coefficient k according to brightness information, a frequency characteristic of the input image X(n) or the like.

Based on the weighting coefficient k determined by the weighting coefficient control unit 142, the coefficient multiplier 143 multiplies a pixel value included in the input image X(n) by (1−k), and the coefficient multiplier 144 multiplies corresponding a pixel value included in the motion compensation image C(n) by k. The adder 145 adds outputs from the coefficient multipliers 143 and 144. An output from the adder 145 is supplied to the time base converting unit 16 and the motion compensation image generating unit 146 as a three-dimensional noise reduced image B(n).

The motion compensation image generating unit 146 generates a motion compensation image C(n+1) based on the three-dimensional noise reduced image B(n) and the motion vector MV detected by the motion vector detecting unit 12. The motion compensation image generating unit 146 generates the motion compensation image C(n+1) using a motion vector directed from future to past, so as to match a position of the input image X(n+1) next supplied to the three-dimensional noise reduction processing unit 14. The generated motion compensation image C(n+1) is stored in the motion compensation image memory 141.

Using the motion vector MV detected by the motion vector detecting unit 12 and based on the two-dimensional noise reduced image A(n), the interpolated image generating unit 15 generates the interpolated image Y(n+0.5) to be interpolated intermediately between the corrected original image Y(n) and the corrected original image Y(n+1). The generated interpolated image Y(n+0.5) is supplied to the time base converting unit 16.

The three-dimensional noise reduced image B(n) supplied to the time base converting unit 16 is used as the corrected original image Y(n) as it is. The time base converting unit 16 sequentially outputs the corrected original image Y(n) and the interpolated image Y(n+0.5). More specifically, the time base converting unit 16 first outputs the corrected original image Y(n), and then outputs the interpolated image Y(n+0.5) delaying by 1/120 seconds. As a result, the output image signal Vout having a frame rate of 120 Hz and including corrected original images and interpolated images alternately is output from the image processing device 10.

As described above, in the image processing device 10, the corrected original image is obtained by performing the recursive noise reduction process to an input image. The interpolated image is generated based on the image resulted by applying the two-dimensional noise reduction filter to the input image. In this manner, the interpolated image is generated based on the image obtained by the method different from that for the correction image.

In the following, effects of the image processing device 10 according to this embodiment will be described. As described above, the image processing device 10 performs the frame rate conversion process based on the motion compensation and the recursive noise reduction process using the motion vector. With this, it is possible to prevent motion blurs that occur in a hold-type display device, and to prevent a residual image in a motion area from occurring, and whereby a clear and high-quality output image can be obtained. In particular, performing the recursive process provides the same effect as in a case in which images of several frames are referred. Further, by performing the recursive noise reduction process using the motion vector, it is possible to carry out a weighted addition following movements and to effectively prevent a blur from occurring. Moreover, in the image processing device 10, the motion vector MV detected by the motion vector detecting unit 12 is used both in the frame rate conversion process and the recursive noise reduction process. By using the motion vector detecting unit 12 commonly both in the frame rate conversion process and the recursive noise reduction process in this manner, it is possible to reduce a circuit size and a memory capacity.

Figure 14:
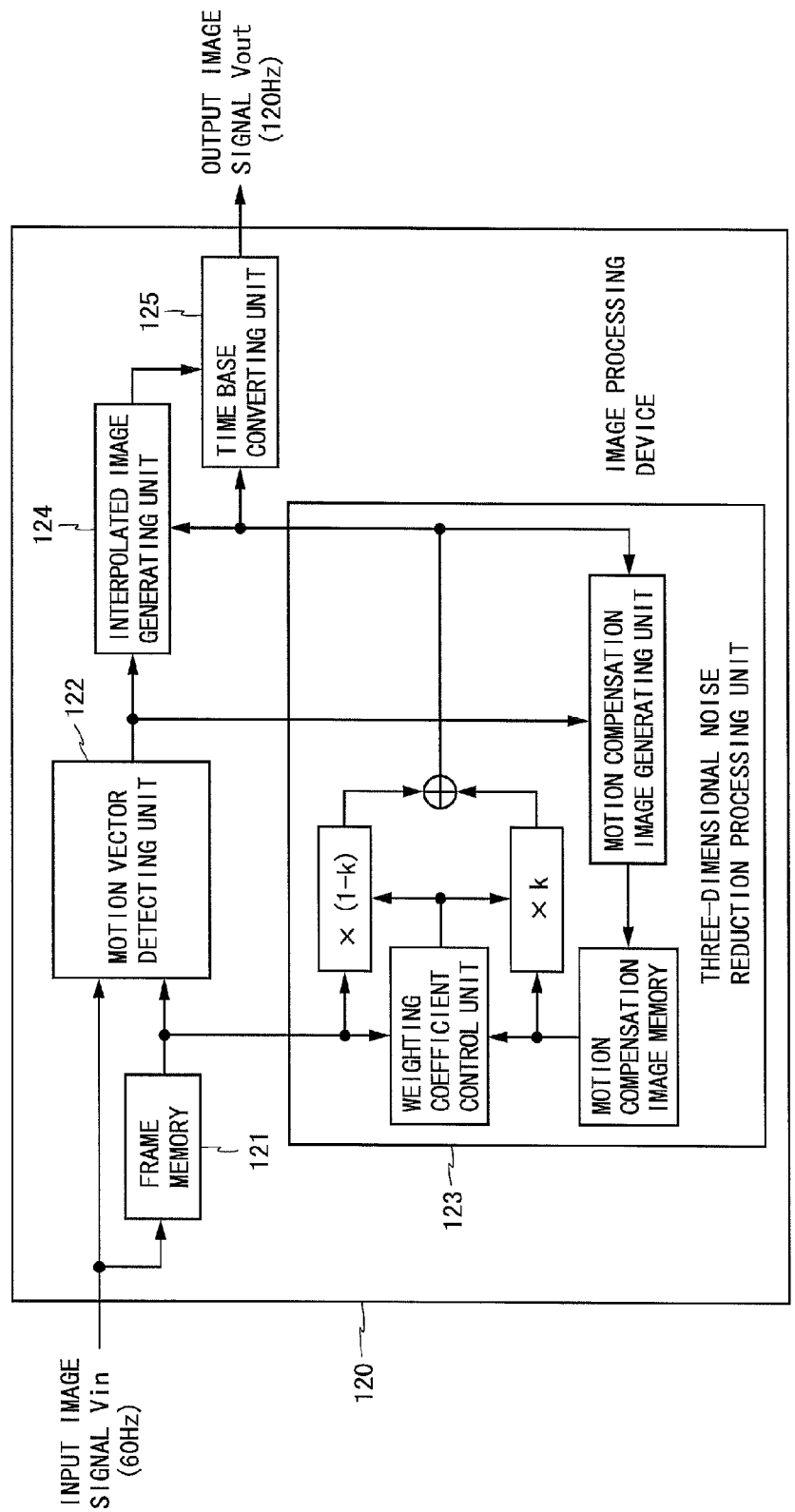
FIG. 14 is a block diagram illustrating a configuration of a conventional image processing device.

As described above, the conventional image processing device that performs the frame rate conversion process and the recursive noise reduction process (the image processing device 120 illustrated in FIG. 14, for example) involves a problem that the interpolated image is significantly degraded when the false detection of a motion vector occurs, as the interpolated image is generated based on the image after the recursive noise reduction process.

By contrast, the image processing device 10 according to this embodiment takes the image resulted by performing the recursive noise reduction process to the input image X(n) as the corrected original image Y(n), and generates the interpolated image Y(n+0.5) based on the image resulted by applying the two-dimensional noise reduction filter to the input image X(n). As described above, the image processing device 10 generates the interpolated image that can be significantly degraded when the false detection of a motion vector occurs, based on the image resulted without performing the recursive noise reduction process, instead of the image resulted by performing the recursive noise reduction process. Therefore, according to the image processing device 10, even when the false detection of a motion vector occurs, it is possible to prevent significant degradation of the interpolated image.

Further, the image processing device 10 generates the interpolated image based on the image resulted by applying the two-dimensional noise reduction filter. Therefore, according to the image processing device 10, it is possible to reduce noises that are contained in the interpolated image and that cannot be reduced through the recursive noise reduction process. Here, the noises that cannot be reduced through the recursive noise reduction process are noises that do not change over time including a mosquito noise that occurs always at the same position in a still image, for example.

Moreover, in general, when the frame rate conversion process is performed, image degradation such as edge distortion occurs. The image processing device 10 generates the interpolated image based on the image resulted by applying the two-dimensional noise reduction filter. Therefore, according to the image processing device 10, it is possible to suppress edge distortion in the interpolated image by blurring edges.

Furthermore, according to the liquid crystal display device 1 having the image processing device 10 as an image processing unit (FIG. 2), it is possible to reduce motion blurs that occur in a hold-type display device, and to prevent a residual image in a motion area from occurring, and whereby a clear and high-quality image can be displayed. In addition, even when the false detection of a motion vector occurs, it is possible to prevent significant degradation of the interpolated image.

Second Embodiment

Figure 4:
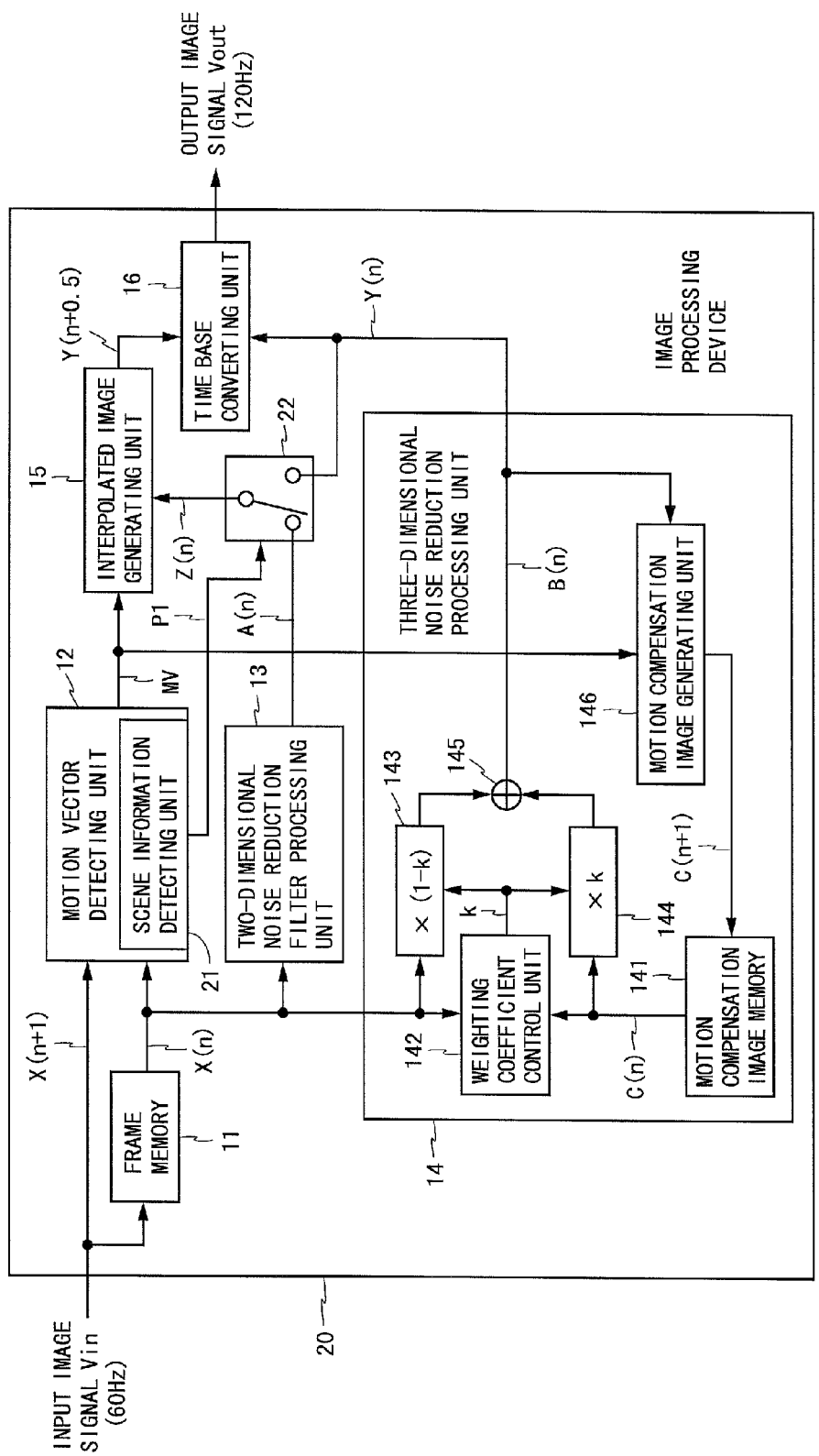
FIG. 4 is a block diagram illustrating a configuration of an image processing device according to a second embodiment of the present invention.

FIG. 4 is a block diagram illustrating a configuration of an image processing device according to a second embodiment of the present invention. An image processing device 20 illustrated in FIG. 4 is configured such that a scene information detecting unit 21 and a selecting unit 22 are additionally provided for the image processing device 10 according to the first embodiment. Similarly to the image processing device 10 according to the first embodiment, an image processing device according to each embodiment described hereinafter is used by being built within the liquid crystal display device 1 illustrated in FIG. 2. Further, components in each embodiment that are the same as components in former embodiments are denoted by the same reference numerals, and descriptions for such components are omitted.

The scene information detecting unit 21 detects scene information based on an input image $X(n)$, and outputs a selection control signal P1 based on the detected scene information (details will be described later). The selection control signal P1 is a binary signal, and changes between a high level and a low level for each image. For example, the selection control signal P1 is at a high level when a scene change occurs in the input image $X(n)$, and otherwise is at a low level.

The selecting unit 22 selects a two-dimensional noise reduced image $A(n)$ obtained by a two-dimensional noise reduction filter processing unit 13 when the selection control signal P1 is at a high level, and selects a three-dimensional noise reduced image $B(n)$ obtained by a three-dimensional noise reduction processing unit 14 when the selection control signal P1 is at a low level. The image selected by the selecting unit 22 is supplied to an interpolated image generating unit 15 as a reference image $Z(n)$.

Using a motion vector MV detected by a motion vector detecting unit 12, the interpolated image generating unit 15 generates an interpolated image $Y(n+0.5)$ to be interpolated intermediately between a corrected original image $Y(n)$ and a corrected original image $Y(n+1)$ based on the reference image $Z(n)$ obtained by the selecting unit 22. The interpolated image $Y(n+0.5)$ is generated based on the two-dimensional noise reduced image $A(n)$ when a scene change occurs in the input image $X(n)$, and otherwise generated based on the three-dimensional noise reduced image $B(n)$.

In the following, the scene information detecting unit 21 will be described. The scene information detecting unit 21 performs statistical processing relating to a brightness difference between two consecutive frames and motion vectors within a screen, and detects a characteristic of a scene (scene information) represented by the input image $X(n)$. The scene information includes information for a scene change, a high-speed scrolling/panning image, a still image, a fade-in/out image and the like, for example.

The scene information detecting unit 21 may obtain brightness histograms of an entire screen for two consecutive frames, for example, and determine that a scene change occurs when a difference between the two histograms is large. The scene information detecting unit 21 may also determine that a scene change has occurred when the number of low-accuracy vectors in an entire screen is large based on accuracy information of the motion vector. The scene information detecting unit 21 may detect a scene change based on information supplied from outside the image processing device 10. For example, the scene information detecting unit 21 may detect a scene change based on a decoding result received from a decoding unit (not shown in the drawings).

In general, the false detection of a motion vector occurs frequently when the scene change occurs. Thus, the scene information detecting unit 21 outputs the selection control signal P1 at a high level when it is determined that the scene change has occurred. Accordingly, when a scene change occurs, the interpolated image $Y(n+0.5)$ is generated based on the two-dimensional noise reduced image $A(n)$ instead of the three-dimensional noise reduced image $B(n)$. In this manner, when a scene change occurs, by generating an interpolated image based on an image resulted without performing the recursive noise reduction process, it is possible to prevent significant degradation of the interpolated image.

It should be noted that when a scene change occurs, the detection accuracy of a motion vector often remains low for a while. Accordingly, when a scene change is detected, it is preferable that the scene information detecting unit 21 output the selection control signal P1 at a high level for awhile (over several frame periods, for example).

Further, the scene information detecting unit 21 may obtain an average value of motion vectors of an entire screen (average vector), for example, and determine that the input image is a high-speed scrolling image when the average vector is large. The scene information detecting unit 21 may obtain a peak vector (most frequent vector) from histogram of the motion vectors of an entire screen, and determine that the input image is a high-speed scrolling image when the peak vector is large. The scene information detecting unit 21 may count a number of times when a motion vector greater than a predetermined value is detected or a number of times when detection of a motion vector fails due to exceeding a detection range, and determine that the input image is a high-speed scrolling image when either of the numbers is large.

In general, the false detection of a motion vector occurs frequently in a high-speed scrolling image. Thus, the scene information detecting unit 21 outputs the selection control signal P1 at a high level when the input image is determined to be a high-speed scrolling image. Accordingly, when the input image is a high-speed scrolling image, the interpolated image $Y(n+0.5)$ is generated based on the two-dimensional noise reduced image $A(n)$ instead of the three-dimensional noise reduced image $B(n)$. In this manner, when the input image is a high-speed scrolling image, by generating an interpolated image based on an image resulted without performing the recursive noise reduction process, it is possible to prevent significant degradation of the interpolated image.

Moreover, the scene information detecting unit 21 may determine that the input image is a still image when a brightness difference between two consecutive frames is sufficiently small, for example. The scene information detecting unit 21 may determine that the input image is a still image when the average vector or the peak vector is sufficiently close to a zero vector, or when many of the detected motion vectors are a zero vector.

In general, the false detection of a motion vector hardly occurs in a still image. Thus, the scene information detecting unit 21 outputs the selection control signal P1 at a low level when the input image is determined to be a still image. Accordingly, when the input image X(n) is a still image, the interpolated image Y(n+0.5) is generated based on the three-dimensional noise reduced image B(n).

As described above, according to the image processing device 20, the corrected original image is obtained by performing a recursive noise reduction process to the input image. The interpolated image is generated based on the reference image obtained by switching between the image resulted by applying the two-dimensional noise reduction filter to the input image and the image resulted by performing the recursive noise reduction process to the input image. In this manner, the interpolated image is generated based on the reference image obtained by the method different from that for the correction image.

As described above, the image processing device 20 according to this embodiment includes the scene information detecting unit 21 that detects the scene information based on the input image X(n), and the selecting unit 22 that selects one of the output from the two-dimensional noise reduction filter processing unit 13 and the output from the three-dimensional noise reduction processing unit 14 to obtain the reference image Z(n). The selecting unit 22 performs the selection based on the scene information detected by the scene information detecting unit 21.

Therefore, according to the image processing device 20 of this embodiment, it is possible to obtain the reference image by switching between the image resulted by performing the recursive noise reduction process and the image resulted without performing the recursive noise reduction process according to the characteristic of the scene represented by the input image, and to generate the interpolated image based thereon. Consequently, it is possible to generate a suitable interpolated image according to the characteristic of the scene, and to prevent significant degradation of the interpolated image even when the false detection of a motion vector occurs. In addition, by generating the interpolated image based on the image resulted by applying the noise reduction filter, it is possible to reduce noises that are contained in the interpolated image and that cannot be reduced through the recursive noise reduction process.

Third Embodiment

Figure 5:
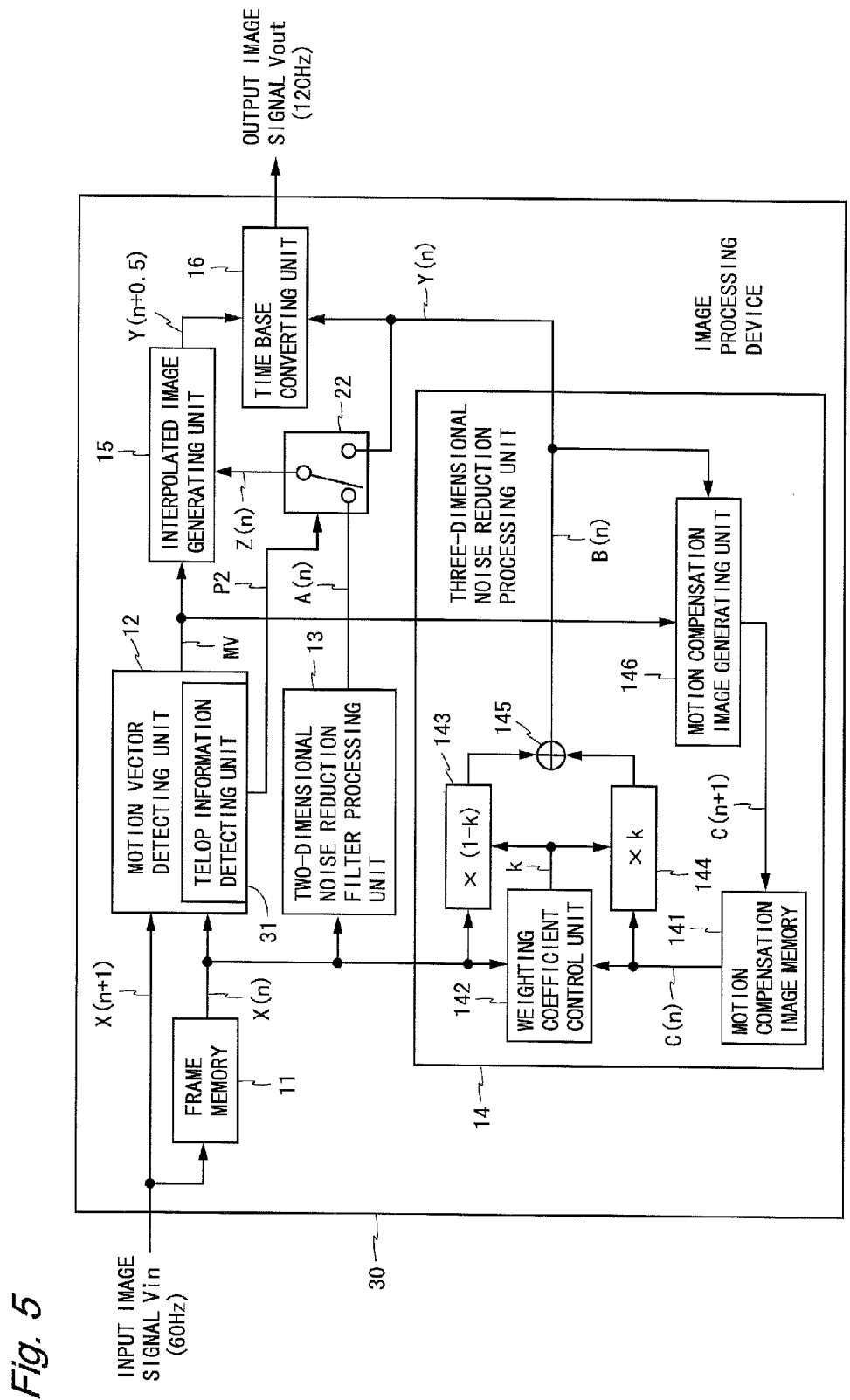
FIG. 5 is a block diagram illustrating a configuration of an image processing device according to a third embodiment of the present invention.

FIG. 5 is a block diagram illustrating a configuration of an image processing device according to a third embodiment of the present invention. An image processing device 30 illustrated in FIG. 5 is configured such that the scene information detecting unit 21 in the image processing device 20 according to the second embodiment is replaced with a telop information detecting unit 31.

The telop information detecting unit 31 detects telop information based on an input image X(n), and outputs a selection control signal P2 based on the detected telop information (details will be described later). The selection control signal P2 is a binary signal, and changes between a high level and a low level for each pixel, line, or strip-shaped area (constituted by a plurality of lines) within an image. For example, when the input image X(n) includes a telop, the selection control signal P2 is at a high level within a telop area and is at a low level outside the telop area.

A selecting unit 22 and an interpolated image generating unit 15 are operated in the same manner as in the second embodiment. Therefore, when the input image X(n) includes the telop, an interpolated image Y(n+0.5) is generated based on a two-dimensional noise reduced image A(n) within the telop area, and generated based on a three-dimensional noise reduced image B(n) outside the telop area, for example.

In the following, the telop information detecting unit 31 will be described. The telop information detecting unit 31 performs statistical processing relating to motion vectors within a screen, and obtains a position and a speed of the telop area included in the input image X(n). The position of the telop area is indicated by a coordinate, a line number, or a number of the strip-shaped area.

Figure 6:
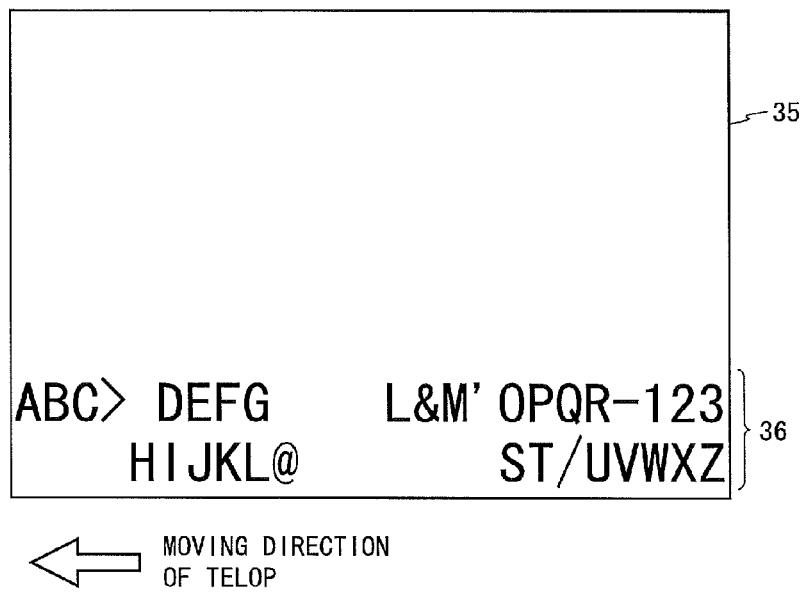
FIG. 6 is a diagram illustrating an example of an input image including a telop.
Figure 7:
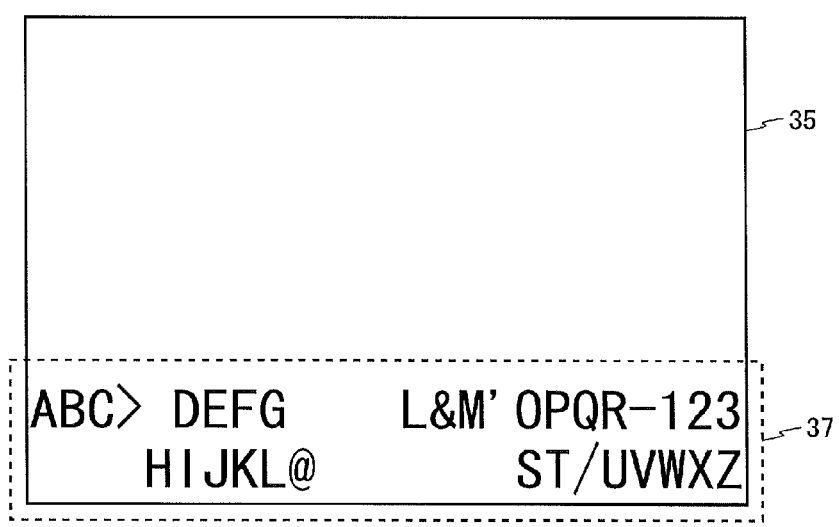
FIG. 7 is a diagram illustrating a result of telop area detection by a telop information detecting unit of the image processing device illustrated in FIG. 5.

FIG. 6 is a diagram illustrating an example of an input image including a telop. An input image 35 illustrated in FIG. 6 includes a telop 36 at a bottom quarter of the image. Characters within the telop 36 (hereinafter, referred to as telop characters) moves leftward at a constant speed (hereinafter, referred to as a telop speed). When the input image 35 is divided into a plurality of blocks and a motion vector is detected for each block, a motion vector corresponding to the telop speed is detected in a block including telop characters. By contrast, a motion vector in a block not including a telop character is substantially a zero vector. Therefore, it is possible to detect a telop area while making a distinction between a block including telop characters and a block not including a telop character. As illustrated in FIG. 7, the telop information detecting unit 31 detects a telop area 37 (an area indicated by a dashed line) in the input image 35.

In general, telop characters move within a displayed screen at a high speed. At a borderline portion between the telop characters and a background, a texture of the background appears in and out behind the characters. Therefore, there can be many areas in which correlation between the frames cannot be made (such an area is referred to as an occlusion area). In the occlusion area, the false detection of a motion vector can easily occur. Further, many of the telop characters have a clear edge. Accordingly, degradation of an interpolated image due to the false detection of a motion vector becomes noticeable in the telop area.

The telop information detecting unit 31 may output the selection control signal P2 at a high level within the telop area, and output the selection control signal P2 at a low level outside the telop area, for example. The telop information detecting unit 31 may output the selection control signal P2 at a high level for a moving portion within the telop area, and output the selection control signal P2 at a low level for a portion not moving or a portion with small movement. The telop information detecting unit 31 may output the selection control signal P2 at a high level for a portion moving at a speed close to the telop speed within the telop area, and output the selection control signal P2 at a low level for the remaining portions.

Accordingly, at a portion in which a telop is present, the interpolated image Y(n+0.5) is generated based on the two-dimensional noise reduced image A(n) instead of the three-dimensional noise reduced image B(n). By generating the interpolated image based on the image resulted without performing the recursive noise reduction process at the portion in which a telop is present in this manner, it is possible to prevent significant degradation of an interpolated image including telops.

As described above, according to the image processing device 30, a corrected original image is obtained by performing a recursive noise reduction process to the input image. The interpolated image is generated based on a reference image obtained by switching between the image resulted by applying the two-dimensional noise reduction filter to the input image and the image resulted by performing the recursive noise reduction process to the input image. In this manner, the interpolated image is generated based on the reference image obtained by the method different from that for the correction image.

As described above, the image processing device 30 according to this embodiment includes the telop information detecting unit 31 that detects the telop information based on the input image X(n), and the selecting unit 22 that selects one of the output from a two-dimensional noise reduction filter processing unit 13 and the output from a three-dimensional noise reduction processing unit 14 to obtain a reference image Z(n). The selecting unit 22 performs the selection based on the telop information detected by the telop information detecting unit 31.

Therefore, according to the image processing device 30 of this embodiment, it is possible to obtain the reference image by switching between the image resulted by performing the recursive noise reduction process and the image resulted without performing the recursive noise reduction process according to the characteristic of the telop included in the input image, and to generate the interpolated image based thereon. Consequently, it is possible to generate a suitable interpolated image according to the characteristic of the telop, and to prevent significant degradation of the interpolated image even when the false detection of a motion vector occurs. In addition, for the portion for which the interpolated image is generated based on the image resulted by applying the noise reduction filter, it is possible to reduce noises that are contained in the interpolated image and that cannot be reduced through the recursive noise reduction process.

Fourth Embodiment

Figure 8:
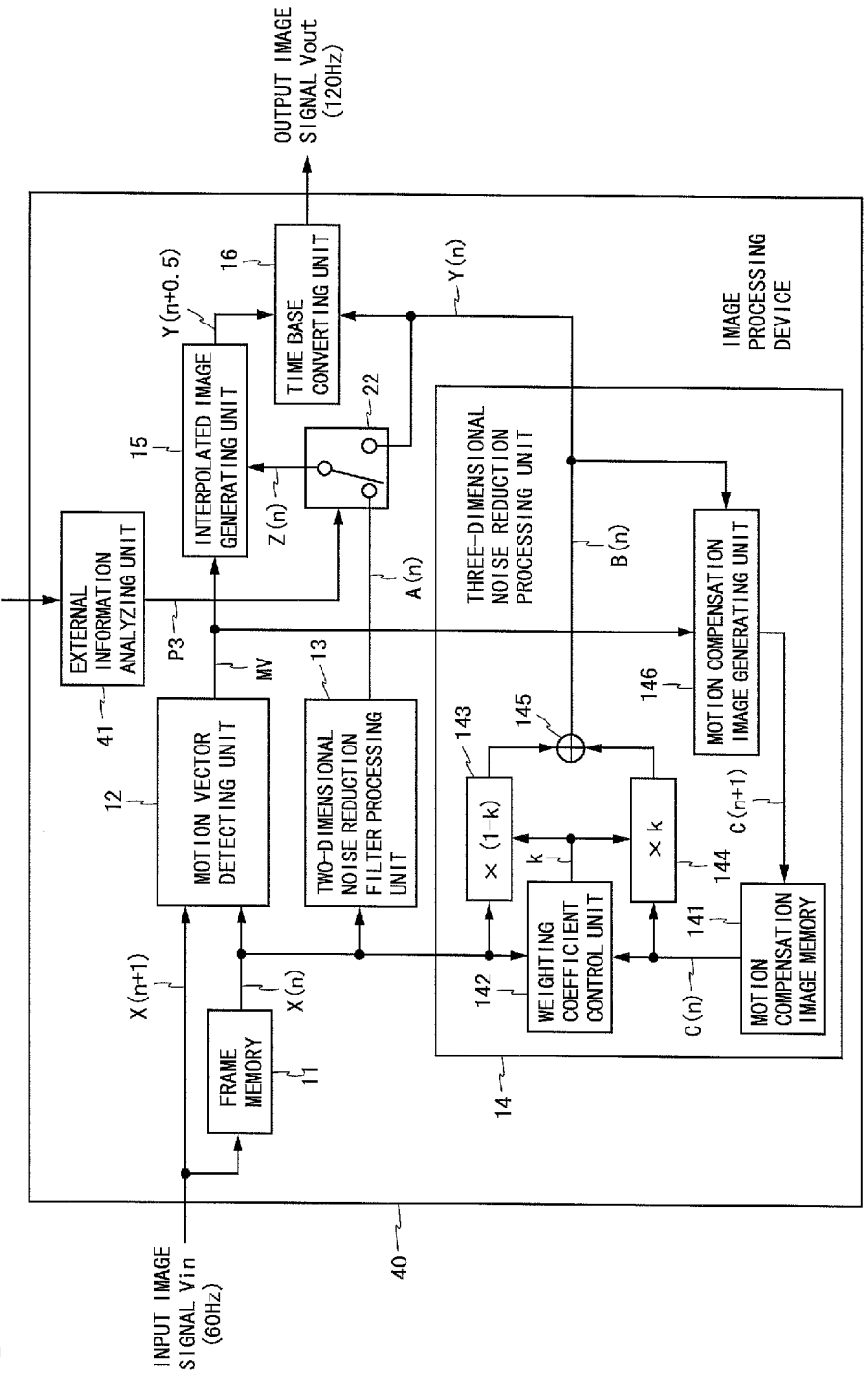
FIG. 8 is a block diagram illustrating a configuration of an image processing device according to a fourth embodiment of the present invention.

FIG. 8 is a block diagram illustrating a configuration of an image processing device according to a fourth embodiment of the present invention. An image processing device 40 illustrated in FIG. 8 is configured such that the scene information detecting unit 21 in the image processing device 20 according to the second embodiment is replaced with an external information analyzing unit 41.

To the image processing device 40 according to this embodiment, an external information signal R is input from outside. The external information analyzing unit 41 analyzes the external information signal R, and outputs a selection control signal P3 based on an obtained analysis result (details will be described later). The selection control signal P3 is a binary signal, and changes between a high level and a low level for each image, pixel, line, or strip-shaped area. For example, the selection control signal P3 is at a high level when an input image X(n) is different from an immediately previous input image, and otherwise is at a low level.

A selecting unit 22 and an interpolated image generating unit 15 are operated in the same manner as in the second embodiment. Therefore, an interpolated image Y(n+0.5) is generated based on a two-dimensional noise reduced image A(n) when the input image X(n) is different from an immediately previous input image, and otherwise generated based on a three-dimensional noise reduced image B(n), for example.

In the following, the external information analyzing unit 41 will be described. The external information signal R input to the external information analyzing unit 41 includes category information of the input image (such as animation, movie, and news), image tone mode information of a display device (such as game, movie, and PC), superimposed image information (such as OSD (On Screen Display), multi-screen, and subtitles), user setting information (such as a magnitude setting for noise reduction) and the like, for example.

For example, when the category information indicates animation, the input image is often a video image resulted from pulling down a video image in a 24p format or a 30p format. For example, the video image resulted from pulling down a video image in the 24p format includes consecutive two or three identical images for each image in order to display a video image of 24 frame/sec in 60 frame/sec.

When identical images are consecutively input, it is preferable to perform a three-dimensional noise reduction process to the following image. By contrast, when different images are input, it is preferable to perform the two-dimensional noise reduction filter to the following image as the false detection of a motion vector easily occurs. The external information analyzing unit 41 determines whether or not identical images are consecutively input based on the category information obtained by analyzing the external information signal R. The external information analyzing unit 41 outputs the selection control signal P3 at a high level when identical images are input, and outputs the selection control signal P3 at a low level when different images are input. The external information analyzing unit 41 may perform a control in a similar manner based on the image tone mode information.

It should be noted that it is preferable to use the image processing device 10 according to the first embodiment in a case in which the frame rate conversion process based on the motion compensation is performed to a video image in the 24p format to generate a video image having a frame rate of 120 Hz (i.e., when interpolating four interpolated images between frames in 24 frame/sec to convert the video image into a video image having a frame rate of 120 frame/sec).

Further, when the input image includes OSD or subtitles superimposed thereon, the characters become illegible by blurring when the two-dimensional noise reduction filter is applied to characters. Accordingly, it is preferable to perform the three-dimensional noise reduction process to a portion to which OSD or subtitles are superimposed. The external information analyzing unit 41 obtains a portion to which OSD or subtitles are superimposed based on the superimposition image information obtained by analyzing the external information signal R. The external information analyzing unit 41 outputs the selection control signal P3 at a low level for the portion to which OSD or subtitles are superimposed, and otherwise outputs the selection control signal P3 at a high level. In the image processing device 40, the interpolated image Y(n+0.5) is generated based on one of the two-dimensional noise reduced image A(n) and the three-dimensional noise reduced image B(n) according to the analysis result by the external information analyzing unit 41.

As described above, according to the image processing device 40, the corrected original image is obtained by performing the recursive noise reduction process to the input image. The interpolated image is generated based on a reference image obtained by switching between the image resulted by applying the two-dimensional noise reduction filter to the input image and the image resulted by performing the recursive noise reduction process to the input image. In this manner, the interpolated image is generated based on the reference image obtained by the method different from that for the correction image.

As described above, the image processing device 40 according to this embodiment includes the external information analyzing unit 41 that analyzes the external information, and the selecting unit 22 that selects one of the output from the two-dimensional noise reduction filter processing unit 13 and the output from the three-dimensional noise reduction processing unit 14 to obtain a reference image Z(n). The selecting unit 22 performs the selection based on the analysis result by the external information analyzing unit 41.

Therefore, according to the image processing device 40 of this embodiment, it is possible to obtain the reference image by switching between the image resulted by performing the recursive noise reduction process and the image resulted without performing the recursive noise reduction process according to the external information that is input from outside, and to generate the interpolated image based thereon.

Consequently, it is possible to generate a suitable interpolated image according to the external information, and to prevent significant degradation of the interpolated image even when the false detection of a motion vector occurs. In addition, for the portion for which the interpolated image is generated based on the image resulted by applying the noise reduction filter, it is possible to reduce noises that are contained in the interpolated image and that cannot be reduced through the recursive noise reduction process.

Fifth Embodiment

Figure 9:
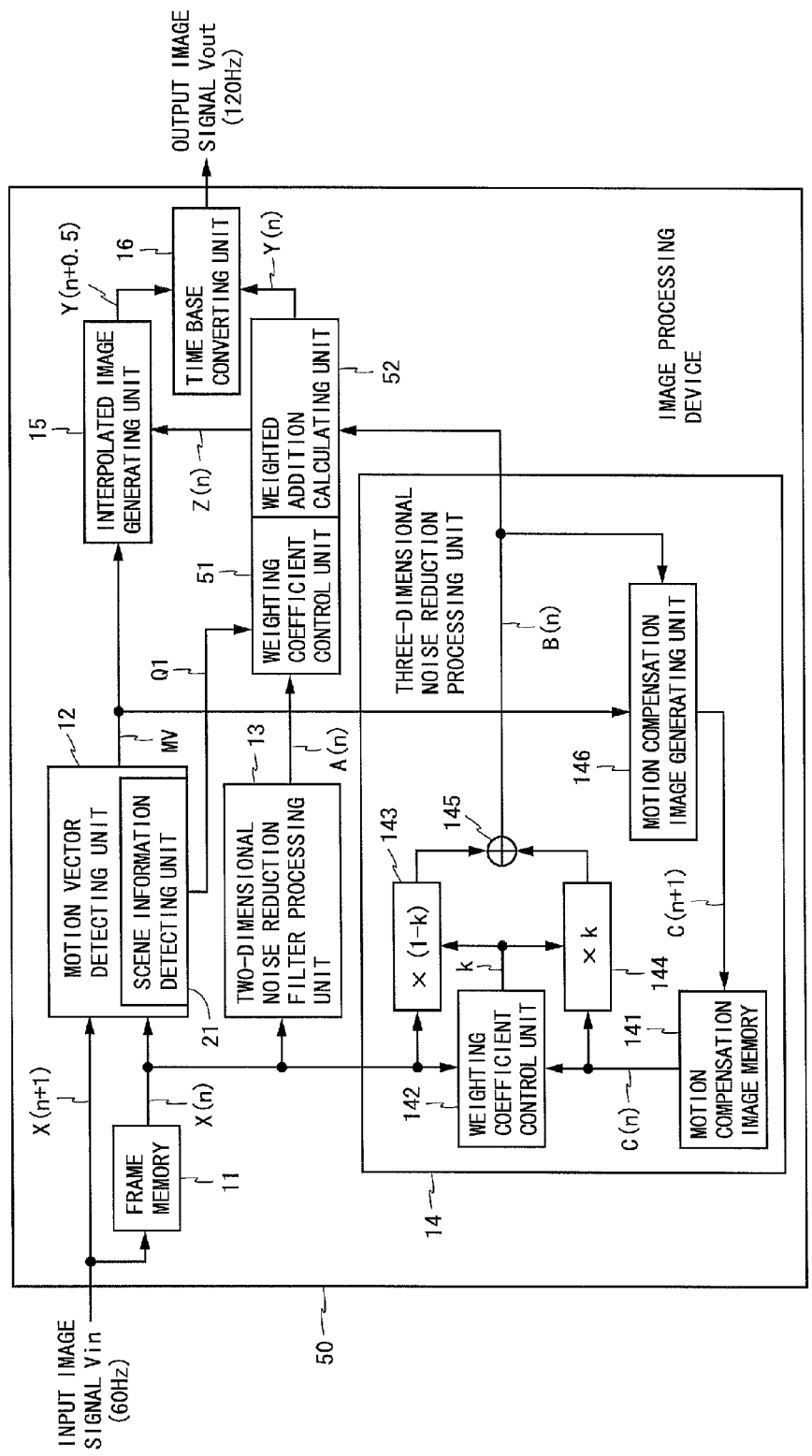
FIG. 9 is a block diagram illustrating a configuration of an image processing device according to a fifth embodiment of the present invention.

FIG. 9 is a block diagram illustrating a configuration of an image processing device according to a fifth embodiment of the present invention. An image processing device 50 illustrated in FIG. 9 is configured such that the selecting unit 22 in the image processing device 20 according to the second embodiment is replaced with a weighting coefficient control unit 51 and a weighted addition calculating unit 52.

A scene information detecting unit 21 detects the scene information based on an input image X(n). In the scene information detecting unit 21 according to this embodiment, however, outputs a scene information signal Q1 indicating the detected scene information, instead of the selection control signal P1. The scene information signal Q1 may be a multi-valued signal, or may be constituted as a plurality of signals.

Figure 10:
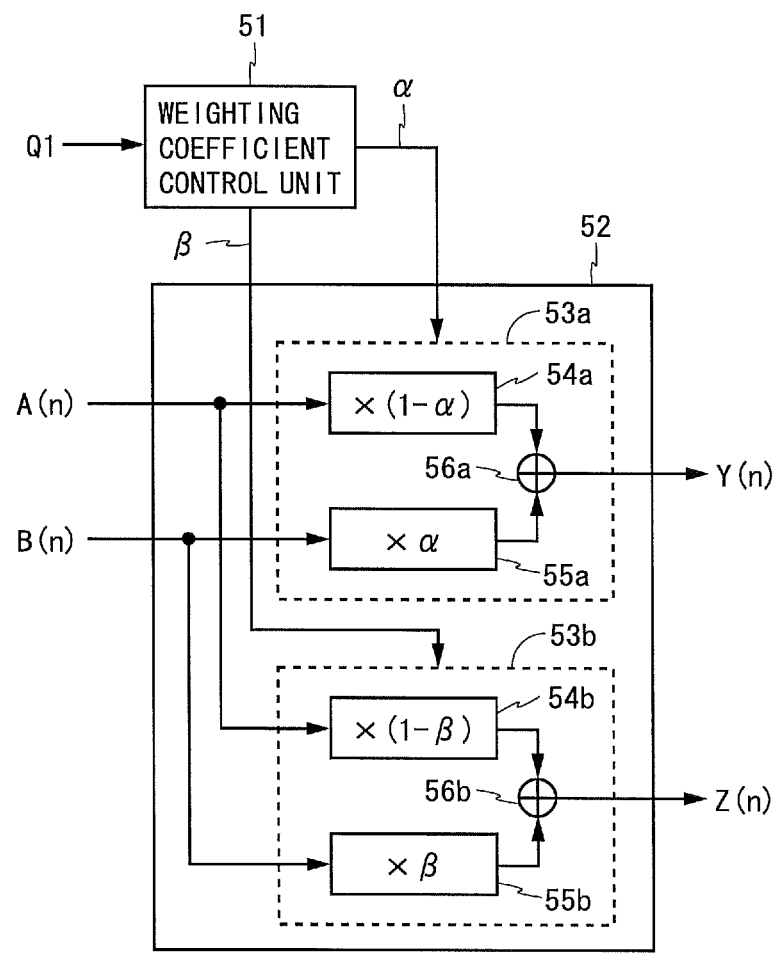
FIG. 10 is a block diagram illustrating details of a weighting coefficient control unit and a weighted addition calculating unit of the image processing device illustrated in FIG. 9.

FIG. 10 is a block diagram illustrating details of the weighting coefficient control unit 51 and the weighted addition calculating unit 52. As illustrated in FIG. 10, the weighted addition calculating unit 52 includes a weighted addition unit 53a for corrected original image having coefficient multipliers 54a and 55a and an adder 56a, and a weighted addition unit 53b for interpolated image having coefficient multipliers 54b and 55b and an adder 56b.

The weighting coefficient control unit 51 obtains weighting coefficients α and β based on the scene information signal Q1 (where 0≤α≤1, 0≤β≤1) (details will be described later). To the weighted addition calculating unit 52, a two-dimensional noise reduced image A(n) obtained by a two-dimensional noise reduction filter processing unit 13, a three-dimensional noise reduced image B(n) obtained by a three-dimensional noise reduction processing unit 14, and the weighting coefficients α and β obtained by the weighting coefficient control unit 51 are input. The coefficient multiplier 54a multiplies a pixel value included in the two-dimensional noise reduced image A(n) by (1−α), the coefficient multiplier 55a multiplies a pixel value included in the three-dimensional noise reduced image B(n) by α, and the adder 56a adds outputs from the coefficient multipliers 54a and 55a. The coefficient multiplier 54b multiplies the pixel value included in the two-dimensional noise reduced image A(n) by (1−β), the coefficient multiplier 55b multiplies the pixel value included in the three-dimensional noise reduced image B(n) by β, and the adder 56b adds outputs from the coefficient multipliers 54b and 55b.

The output from the weighted addition unit 53a for corrected original image is supplied to the time base converting unit 16 as a corrected original image Y(n). The output from the weighted addition unit 53b for interpolated image is supplied to an interpolated image generating unit 15 as a reference image Z(n). Expressions (1) and (2) as listed below are established among the two-dimensional noise reduced image A(n), the three-dimensional noise reduced image B(n), the corrected original image Y(n), and the reference image Z(n).

$$Y(n)=(1-\alpha)\times A(n)+\alpha\times B(n) \quad (1)$$

$$Z(n)=(1-\beta)\times A(n)+\beta\times B(n) \quad (2)$$

(where 0≤α≤1, 0≤β≤1)

Using the motion vector MV detected by the motion vector detecting unit 12, the interpolated image generating unit 15 generates an interpolated image Y(n+0.5) to be interpolated intermediately between the corrected original image Y(n) and a corrected original image Y(n+1) based on the reference image Z(n) obtained by the weighted addition unit 53b for interpolated image.

In the following, the weighting coefficient control unit 51 will be described. When a motion amount in the input image X(n) is large, the false detection of a motion vector can easily occur. In this case, as there is a possibility that the three-dimensional noise reduced image B(n) is degraded, the weighting coefficient control unit 51 decreases the weighting coefficient α. With this, it is possible to obtain the corrected original image Y(n) close to the two-dimensional noise reduced image A(n). Further, as the interpolated image Y(n+0.5) is easily degraded as compared to the corrected original image Y(n), the weighting coefficient control unit 51 decreases the weighting coefficient β to be smaller than the weighting coefficient α. Accordingly, the interpolated image Y(n+0.5) is generated based on the reference image Z(n) that is closer to the two-dimensional noise reduced image A(n) than the corrected original image Y(n). With this, it is possible to prevent significant degradation of the interpolated image.

When a motion amount in the input image X(n) is small, the false detection of a motion vector does not easily occur, and significant degradation of the interpolated image does not easily occur as well. In this case, the weighting coefficient control unit 51 increases the weighting coefficient α. With this, it is possible to obtain the corrected original image Y(n) close to the three-dimensional noise reduced image B(n). As the interpolated image Y(n+0.5) is degraded to some extent through the frame rate conversion process, the weighting coefficient control unit 51 decreases the weighting coefficient β to be slightly smaller than the weighting coefficient α.

It should be noted that most of substantially still images are originally clear images only with a small amount of blurring. Applying the two-dimensional noise reduction filter to such an image can cause a blur, and shows the image adversely in a degraded manner. Therefore, it is preferable to perform the three-dimensional noise reduction process to a substantially still image. By contrast, as an image with a large motion is blurred originally, the image does not give an impression that the image has become blurred even if the two-dimensional noise reduction filter is applied. Therefore, it is preferable to apply the two-dimensional noise reduction filter to an image with a large motion.

As described above, according to the image processing device 50, the corrected original image is obtained by performing the weighted addition to the two-dimensional noise reduced image and the three-dimensional noise reduced image using the weighting coefficient α. The interpolated image is generated based on the reference image obtained by performing the weighted addition to the two-dimensional noise reduced image and the three-dimensional noise reduced image using the weighting coefficient β. In this manner, the interpolated image is generated based on the reference image obtained by the method different from that for the correction image.

As described above, the image processing device 50 according to this embodiment includes the scene information detecting unit 21 that detects the scene information based on the input image X(n), and the weighted addition calculating unit 52 that performs two weighted additions separately to the outputs from the two-dimensional noise reduction filter processing unit 13 and the three-dimensional noise reduction processing unit 14. The corrected original image Y(n) is an image obtained by one of the weighted additions by the weighted addition calculating unit 52, and the reference image Z(n) is an image obtained by the other of the weighted additions by the weighted addition calculating unit 52. The weighting coefficients α and β of the weighted addition calculating unit 52 change based on the scene information detected by the scene information detecting unit 21.

Therefore, according to the image processing device 50 of this embodiment, it is possible to obtain the reference image by performing the weighted additions to the image resulted by performing the recursive noise reduction process and the image resulted without performing the recursive noise reduction process while changing the weighting coefficients according to the characteristic of the scene represented by the input image, and to generate the interpolated image based thereon. Consequently, it is possible to generate a suitable interpolated image according to the characteristic of the scene, and to prevent significant degradation of the interpolated image even when the false detection of a motion vector occurs. In addition, when the reference image is obtained by increasing the weighting coefficient to be given to the image resulted by applying the noise reduction filter and the interpolated image is generated based on this reference image, it is possible to reduce noises that are contained in the interpolated image and that cannot be reduced through the recursive noise reduction process.

Figure 11:
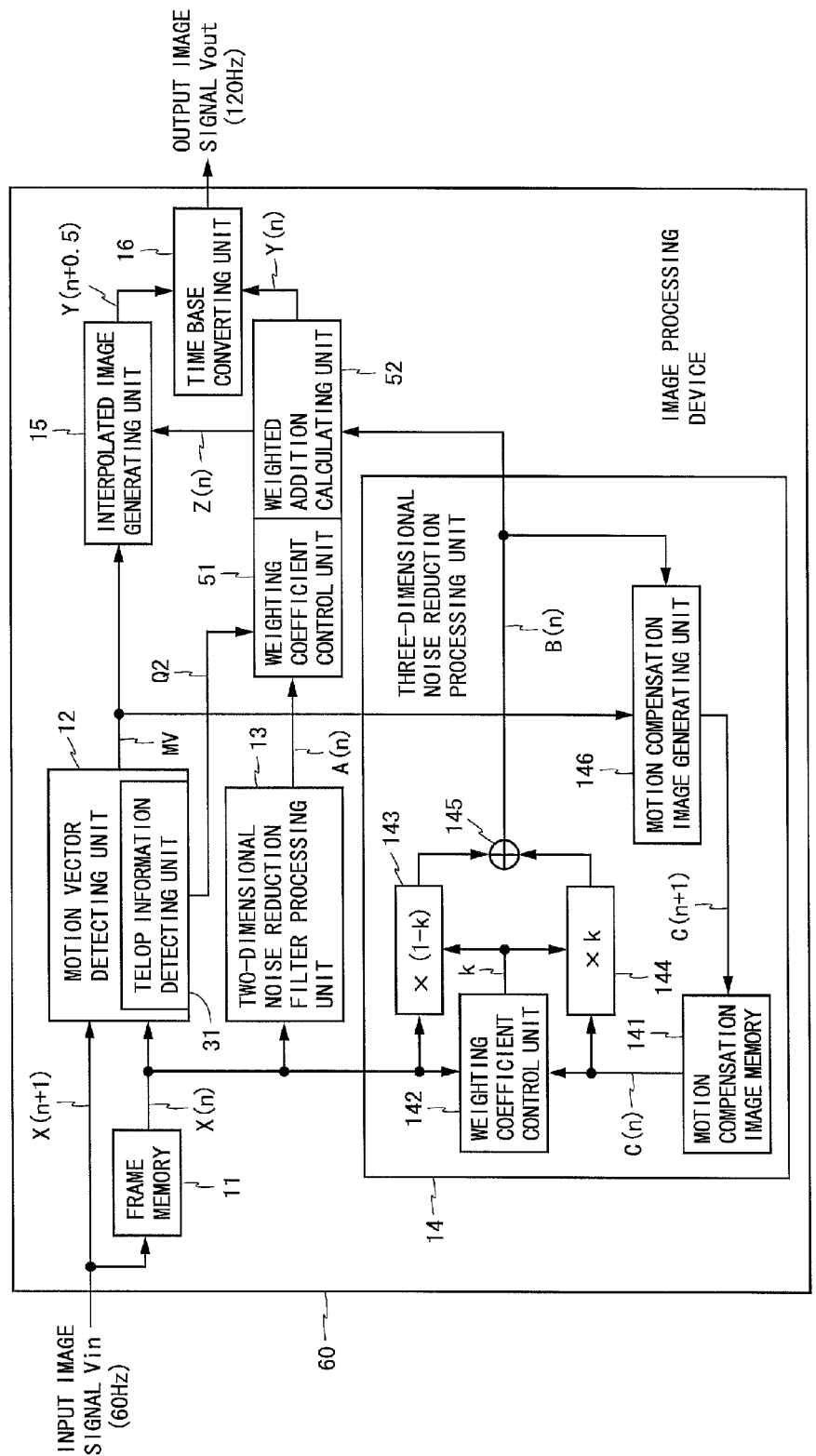
FIG. 11 is a block diagram illustrating a configuration of an image processing device according to a first modified example of the fifth embodiment of the present invention.
Figure 12:
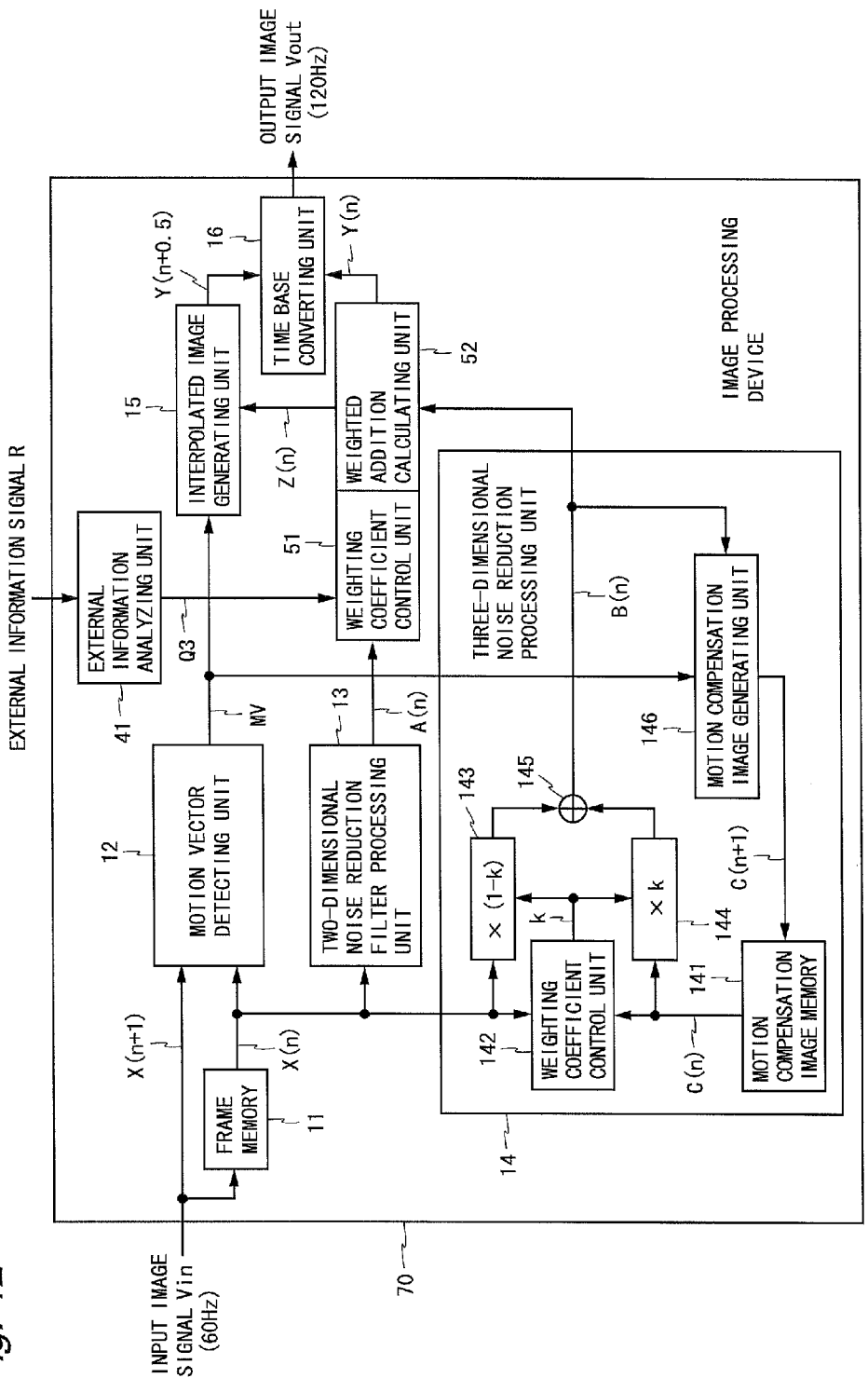
FIG. 12 is a block diagram illustrating a configuration of an image processing device according to a second modified example of the fifth embodiment of the present invention.
Figure 13:
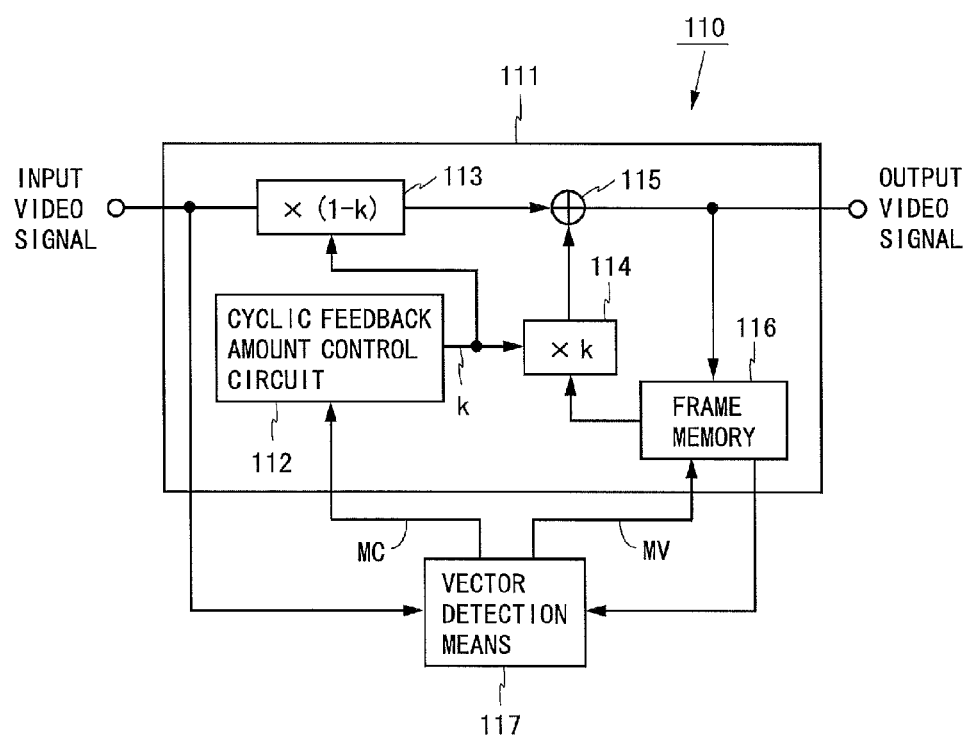
FIG. 13 is a block diagram illustrating a configuration of a conventional noise reduction device.

It should be noted that the fifth embodiment can take modified examples as described below. FIG. 11 and FIG. 12 are block diagrams each illustrating a configuration of an image processing device according to the modified examples of the fifth embodiment. An image processing device 60 illustrated in FIG. 11 is configured by modifying the image processing device 30 according to the third embodiment. In the image processing device 60, the telop information detecting unit 31 outputs a telop information signal Q2 indicating the telop information, and the weighting coefficient control unit 51 changes the weighting coefficient of the weighted addition calculating unit 52 based on the telop information signal Q2. An image processing device 70 illustrated in FIG. 12 is configured by modifying the image processing device 40 according to the fourth embodiment. In the image processing device 70, the external information analyzing unit 41 outputs an analysis result signal Q3 indicating an analysis result by the external information, and the weighting coefficient control unit 51 changes the weighting coefficient of the weighted addition calculating unit 52 based on the analysis result signal Q3.

The image processing devices 60 and 70 according to the modified examples provide the same effects as those of the image processing device 50. Specifically, according to the image processing device 60 or 70, it is possible to obtain the reference image by performing the weighted additions to the image resulted by performing the recursive noise reduction process and the image resulted without performing the recursive noise reduction process while changing the weighting coefficients according to the characteristic of the telop included in the input image (or, according to the external information input from outside), and to generate the interpolated image based thereon. Consequently, it is possible to generate a suitable interpolated image according to the characteristic of the telop (or, according to the external information), and to prevent significant degradation of the interpolated image even when the false detection of a motion vector occurs.

Further, each of the first to fifth embodiments has described the image processing device that interpolates a single interpolated image intermediately between two consecutive corrected original images in order to double the frame rate. Alternatively, the image processing device according to the present invention may interpolate a plurality of interpolated images between two consecutive corrected original images in order to increase the frame rate by more than two times. Further, the image processing device according to the present invention may include, instead of the two-dimensional noise reduction filter processing unit 13, a one-dimensional noise reduction filter unit that applies a one-dimensional noise reduction filter to the input image X(n). The one-dimensional noise reduction filter performs a filtering process in one of a horizontal direction and a vertical direction of an image.

As described above, according to the image processing device, the image processing method, the image display device, and the image display method of the present invention, by obtaining the reference image by the method different from that for the corrected original image, it is possible to generate an interpolated image based on a suitable reference image, and to prevent significant degradation of the interpolated image even when the false detection of a motion vector occurs.

INDUSTRIAL APPLICABILITY

The image processing device, the image processing method, the image display device, and the image display method of the present invention can provide an effect of preventing significant degradation of the interpolated image even when the false detection of a motion vector occurs, and therefore can be applied as an image processing device, an image processing method, an image display device, and an image display method of various types that perform a frame rate conversion process and recursive noise reduction process.

DESCRIPTION OF REFERENCE CHARACTERS

1: LIQUID CRYSTAL DISPLAY DEVICE
2: TIMING CONTROL CIRCUIT
3: SCANNING SIGNAL LINE DRIVE CIRCUIT
4: DATA SIGNAL LINE DRIVE CIRCUIT
5: LIQUID CRYSTAL PANEL
6: PIXEL CIRCUIT
10, 20, 30, 40, 50, 60, 70: IMAGE PROCESSING DEVICE
11: FRAME MEMORY
12: MOTION VECTOR DETECTING UNIT
13: TWO-DIMENSIONAL NOISE REDUCTION FILTER PROCESSING UNIT
14: THREE-DIMENSIONAL NOISE REDUCTION PROCESSING UNIT
15: INTERPOLATED IMAGE GENERATING UNIT
16: TIME BASE CONVERTING UNIT
21: SCENE INFORMATION DETECTING UNIT
22: SELECTING UNIT
31: TELOP INFORMATION DETECTING UNIT

35: INPUT IMAGE
36: TELOP
37: TELOP AREA
41: EXTERNAL INFORMATION ANALYZING UNIT
51: WEIGHTING COEFFICIENT CONTROL UNIT
52: WEIGHTED ADDITION CALCULATING UNIT
53: WEIGHTED ADDITION UNIT

The invention claimed is:

1. An image processing device for performing a frame rate conversion process and a recursive noise reduction process, the device comprising:
    a motion vector detecting unit configured to detect a motion vector from input images that are input consecutively;
    a first noise reduction processing unit configured to perform the recursive noise reduction process to the input image using the motion vector;
    a second noise reduction processing unit configured to apply a noise reduction filter to the input image; and
    an interpolated image generating unit configured to generate an interpolated image using the motion vector and based on a reference image, wherein
    a corrected original image obtained by a predetermined method and the interpolated image generated based on the reference image are output, the reference image being obtained by a method different from that for the corrected original image.

2. The image processing device according to claim 1, wherein the corrected original image is an image obtained by the first noise reduction processing unit, and the reference image is an image obtained by the second noise reduction processing unit.

3. The image processing device according to claim 1, further comprising:
    a selecting unit configured to select one of outputs from the first and the second noise reduction processing unit, and to obtain the reference image, wherein
    the corrected original image is an image obtained by the first noise reduction processing unit.

4. The image processing device according to claim 3, further comprising:
    a scene information detecting unit configured to detect scene information based on the input image, wherein
    the selecting unit performs the selection based on the scene information.

5. The image processing device according to claim 3, further comprising:
    a telop information detecting unit configured to detect telop information based on the input image, wherein
    the selecting unit performs the selection based on the telop information.

6. The image processing device according to claim 3, further comprising:
    an external information analyzing unit configured to analyze external information that is input from outside, wherein
    the selecting unit performs the selection based on an analysis result by the external information analyzing unit.

7. The image processing device according to claim 1, further comprising:
    a weighted addition calculating unit configured to perform two weighted additions separately to outputs from the first and the second noise reduction processing unit, wherein
    the corrected original image is an image obtained by one of the weighted additions by the weighted addition calculating unit, and the reference image is an image obtained by the other of the weighted additions by the weighted addition calculating unit.

8. The image processing device according to claim 7, further comprising:
    a scene information detecting unit configured to detect scene information based on the input image, wherein
    a weighting coefficient of the weighted addition calculating unit changes based on the scene information.

9. The image processing device according to claim 7, further comprising:
    a telop information detecting unit configured to detect telop information based on the input image, wherein
    a weighting coefficient of the weighted addition calculating unit changes based on the telop information.

10. The image processing device according to claim 7, further comprising:
    an external information analyzing unit configured to analyze external information that is input from outside, wherein
    a weighting coefficient of the weighted addition calculating unit changes based on an analysis result by the external information analyzing unit.

11. An image processing method of performing a frame rate conversion process and a recursive noise reduction process, the method comprising the steps of:
    detecting a motion vector from input images that are input consecutively;
    performing the recursive noise reduction process to the input image using the detected motion vector;
    applying a noise reduction filter to the input image; and
    generating an interpolated image using the detected motion vector and based on a reference image, wherein
    a corrected original image obtained by a predetermined method and the interpolated image generated based on the reference image are output, the reference image being obtained by a method different from that for the corrected original image.

12. An image display device for displaying an image with performing a frame rate conversion process and a recursive noise reduction process, the device comprising:
    a display panel;
    the image processing device according to claim 1; and
    a drive circuit configured to drive the display panel based on an output from the image processing device.

13. An image display method of displaying an image on a display panel with performing a frame rate conversion process and a recursive noise reduction process, the method comprising the steps of:
    detecting a motion vector from input images that are input consecutively;
    performing the recursive noise reduction process to the input image using the detected motion vector;
    applying a noise reduction filter to the input image;
    generating an interpolated image using the detected motion vector and based on a reference image; and
    driving the display panel based on image signals respectively indicating a corrected original image obtained by a predetermined method and the interpolated image generated based on the reference image, the reference image being obtained by a method different from that for the corrected original image.

* * * * *